June 30, 1925.
W. H. TAYLOR
WEIGH BEAM SUPPORTING MEANS
Filed June 9, 1924
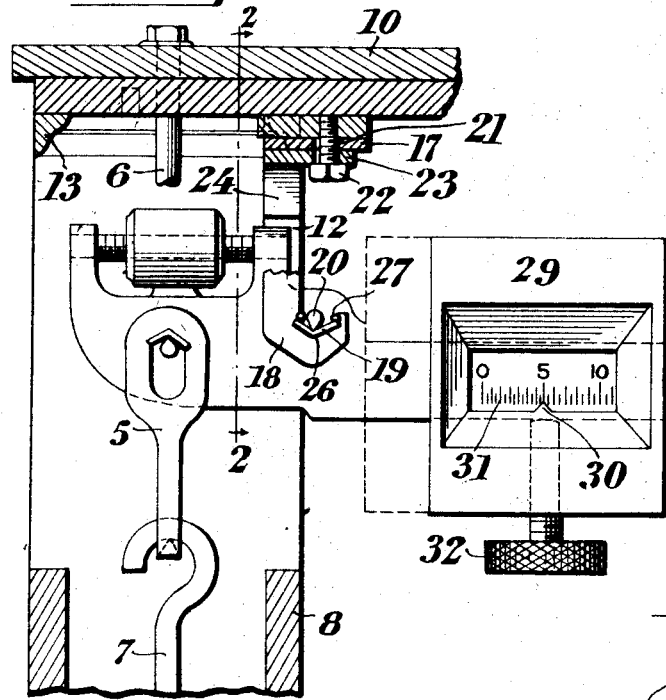
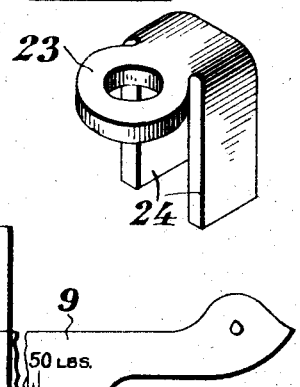
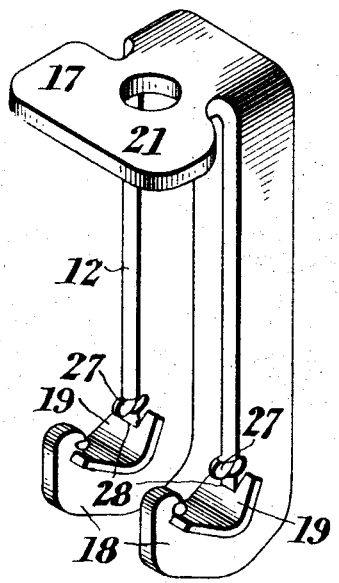
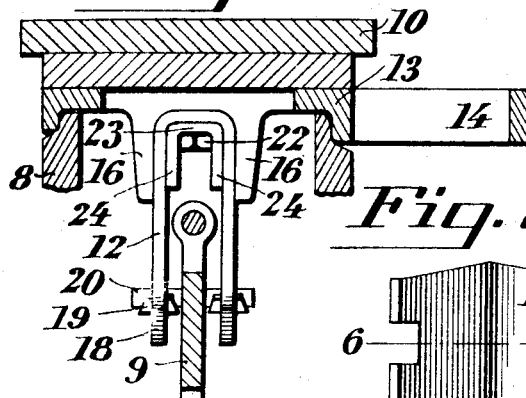
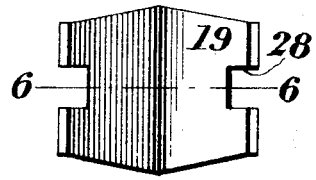
INVENTOR
William H. Taylor
BY M. F. Gannetto
ATTORNEY Patented June 30, 1925.

1,543,735

UNITED STATES PATENT OFFICE.

WILLIAM H. TAYLOR, OF ST. JOHNSBURY, VERMONT, ASSIGNOR TO E. AND T. FAIRBANKS AND COMPANY, OF ST. JOHNSBURY, VERMONT, A CORPORATION OF VERMONT.

WEIGHBEAM-SUPPORTING MEANS.

Application filed June 9, 1924. Serial No. 718,699.

*To all whom it may concern:*

Be it known that I, WILLIAM H. TAYLOR, a citizen of the United States, residing at St. Johnsbury, in the county of Caledonia and State of Vermont, have invented certain new and useful Improvements in Weighbeam-Supporting Means, of which the following is a full, clear, and exact description, such as will enable others skilled in the art to which it appertains to make and use the same.

This invention relates to improvements in weighing scales, and more especially in some of its details to improvements in portable platform scales.

It is a general object of the invention to provide an improved scale of the class mentioned in which simplicity of construction, interchangeability of parts, ease of repair or replacement of parts, and economies in production cost are attained.

A further object of the invention is to provide an improved pivot bearing for scales of simple and durable construction, and to provide an improved and economical method of making the same.

Still another object is to provide an improved beam suspension of simple construction whereby adjustment of the beam position is readily attainable.

Another object is to improve and perfect the elements and assembly of elements in a scale, resulting in production and operating advantages.

Other objects will be in part obvious in connection with the following detailed description of an illustrative embodiment of the invention, and will be in part pointed out in connection therewith.

The invention accordingly comprises the features of construction, combination of elements, and arrangement of parts, which will be exemplified in the construction hereinafter set forth and the scope of the application of which will be indicated in the claims.

A portion of the subject matter of this application was shown in an application filed by Frank E. Church June 19, 1923, Serial No. 646,289, for improvements in portable platform scales. Such application related to an improved type of weighing scale comprising several new features of construction of which those that I will now describe and claim were a part.

For a complete understanding of the nature and objects of the invention, reference is had to the following detailed description and to the accompanying drawings, wherein Figure 1 is an elevation, partly in vertical section of the upper portion of a portable platform scale, showing the suspension means for the weigh-beam, and the improved parts of the construction;

Fig. 2, is a vertical transverse section taken approximately on the line 2—2 of Fig. 1, showing the attachment of the beam-hanger;

Fig. 3 is a detail perspective view of the beam-hanger;

Fig. 4 is a similar view of the spacing member for the beam-hanger;

Fig. 5, is a plan view of the V-shaped bearing plate used in the beam-hanger, and Fig. 6 is a vertical section taken on the line 6—6 of Fig. 5

Referring now to the drawings for a detailed description of the embodiment of the invention there shown, the weigh-beam 9, is supported from a hollow upstanding pillar 8 in which is housed the load transmitting rod 7 and other operating parts of the scale, said rod being connected to the beam 9 by means of a bearing link 5. It is to be understood that the pillar is rigidly mounted on the base frame of the scale (not shown). Carried by the top of the pillar 8 is laterally extending arm 10 that overlies and is substantially paralled to the beam 9.

The beam is suspended and fulcrumed by means of a hanger 12, carried by a hanger cap 13 supported on the pillar 8. The hanger cap is preferably cast metal, and is formed with a laterally extending bracket 14 which can be used for storing reserve weights. The arm 10 and the hanger cap 13 can be secured to the top of the pillar 8 by any suitable means, such for instance as by bolts 6, one of which is shown in Fig. 1.

By preference the hanger cap 13 is of hollow rectangular form, and the hanger 12 is fastened to one side thereof, between a pair of depending lugs 16 which are formed integral with the hanger cap, as shown by Fig. 2.

The beam hanger which is of substantially inverted U form, includes an attaching plate, 17, with depending spaced arms, each having a lower terminal formation, 18, providing a seat for a compensating bearing plate, 19. The beam lies between said spaced arms having opposed pivotal knife edge bearings, 20, for engagement with the bearing plates, 19.

The attaching plate, 17, is secured to the hanger cap, 13, by means of an attachment providing for alignment of the beam. In the embodiment shown, the plate, 17, is provided with an approximately centrally disposed opening, 21, for receiving a single attaching bolt, 22, forming the sole support for the beam hanger. This opening is greater in transverse dimension, than the diameter of the bolt, permitting lateral adjustment of the hanger with reference thereto, and also permitting angular adjustment.

With this arrangement it will be seen that a longitudinal adjustment of the beam may be effected to adapt it to the fulcrum distance between the load pivot and the fulcrum pivot of the beam so as to bring the load pivot plumb over the connection of the load transmitting rod, 7, with the main lever, as is well understood in machines of this character. Furthermore angular adjustment may be effected to bring the tip of the beam into position to hang in the center of the trig loop (not shown). Friction of moving parts is thus avoided, and accuracy of the scale enchanced by this simple and inexpensive expedient. If so desired a spacing member comprising a perforated plate, 23, having downwardly projecting limbs, 24, that engage the sides of the hanger, 12, and press them outwardly against the lugs 16, may be positioned between the head of the bolt, 22, and the underside of the plate 17. This spacing member is in the nature of a washer, and the limbs, 24, thereon serve as means for reinforcing the sides of the beam hanger.

As shown, the improved self-compensating bearing construction includes a plate, 19, substantially V-shaped in end elevation, forming an angular seat for the reception of the beam pivot bearings, 20, this plate perferably being of hardened steel. The bearing plate is seated in a correspondingly shaped seat, 26, formed in the hanger, 12, being secured in position by lugs, 27, overlying the edge of the bearing plate, and preferably integral with the link itself, said lugs being struck up therefrom after the bearing plate is placed in position.

The bearing plate is notched at the edges thereof, as indicated at, 28, for the reception of the sides of the hanger adjacent the bearing seat so as to prevent the bearing plate from sliding longitudinally out of its seat. The slots, 28, are wide enough so the edges thereof engage loosely with the sides of the link, and the retaining lugs, 27, are spaced sufficiently above the edge of the bearing plate to permit freedom of rocking movement, so the plate automatically adjusts itself to the proper position for contacting with the pivot pin. In this manner the bearing is self-compensating and parts thereof will always be properly aligned irrespective of inaccuracies in the proportions of parts and assembly thereof, and this alignment will be retained irrespective of severe usage or wear. The seat of the bearing plate in the hanger being quite narrow readily permits slight rocking movements of the bearing therein.

An inexpensive and convenient method of producing the bearing above described has been devised and being substantially as follows: Bars of steel of substantially the cross-sectional shape of the bearing, that is, in the embodiment shown substantially V-shaped, are provided, and lengths are cut therefrom corresponding to the bearing length desired. These severed lengths are then punched at the lateral edges thereof to provide the notches, 28, and the angular or V-shaped bearing surface may be smoothed or otherwise conditioned, as by grinding. The plate, as thus formed, is placed in its supporting seat, as in the seat provided in the hanger, 12, and the integral lugs, 27, then struck up from the adjacent metal of the supporting seat, as by pinching together the metal at the opposite sides of the link with an appropriate tool, or by punching.

Carried by the beam 9, is a poise, 29, having an index or pointer, 30, that is adapted to register with the scale graduations, 31, with which the face of the beam is provided. As shown, a locking screw, 32, may be provided for locking the poise in adjusted position.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having thus described my invention, what I claim as new and desire to secure by Letters Patent, is:—

1. A rigid weigh-beam hanger of inverted U-form having its depending limbs formed with lateral extensions and bearings adjustably mounted therein.

2. A rigid weigh-beam hanger of inverted U-form having its depending limbs formed with lateral extensions to provide a pair of spaced bearings for supporting said beam, and means whereby said hanger can be shifted relative to said beam.

3. In a scale, in combination, a beam supporting member supported on the scale, a beam hanger of inverted U-form supported on said supported member, lateral extensions formed in the suspension arms of said hanger, bearing means carried by the extensions of said beam hanger, a beam pivotally supported by said bearing means, said bearing means being adjustable to effect angular or bodily adjustment of said beam.

4. In a scale, in combination, a beam supporting member, a beam hanger of inverted U-form having lateral extensions formed in the suspension arms thereof, means for attaching said hanger to said supporting member for angular and bodily adjustment thereon, and a beam pivotally supported on the lateral extensions of said hanger.

5. In a scale, in combination, a beam supporting member supported on the scale, a beam hanger having an opening therein, a securing bolt passing through said opening and secured to said supporting member, said opening being of greater dimension than the diameter of said securing bolt, for permitting adjustment of said beam hanger, spaced compensating bearings supported on said beam hanger, and a beam pivotally supported on said bearings.

6. In a scale, in combination, a beam supporting member supported on the scale, a beam hanger having an attachment plate and spaced suspension arms, spaced compensating bearings supported by said arms, a beam pivotally supported upon said spaced bearings, and means to adjustably attach said beam hanger to said supporting member to permit bodily and angular adjustment thereof.

In testimony whereof, I have hereunto signed my name.

WILLIAM H. TAYLOR.